United States Patent [19]
Rhodes, Jr. et al.

[11] Patent Number: 4,734,230
[45] Date of Patent: Mar. 29, 1988

[54] METHOD AND APPARTUS FOR FORMING COMPOSITE PRODUCTS

[75] Inventors: Richard D. Rhodes, Jr., Dover; Frank J. Preston, Hampton, both of N.H.

[73] Assignee: Ex-Cell-O Corporation, Walled Lake, Mich.

[21] Appl. No.: 889,016

[22] Filed: Jul. 24, 1986

[51] Int. Cl.⁴ .................. C08G 18/14; B29C 45/14
[52] U.S. Cl. .................... 264/46.4; 264/46.5; 264/46.6; 264/46.9; 264/250; 264/267; 264/DIG. 83; 425/127; 425/129 R; 425/543; 425/817 R
[58] Field of Search .............. 264/46.4, 257, 153, 264/46.9, 250, DIG. 83, 267, 46.5, 46.6; 425/543, 817 R, 127, 129 R

[56] References Cited

U.S. PATENT DOCUMENTS

| | | | |
|---|---|---|---|
| 2,811,744 | 11/1957 | Baldanza | 264/153 |
| 4,228,115 | 10/1980 | Gardner et al. | 264/46.4 |
| 4,309,370 | 1/1982 | Sizemore et al. | 264/255 X |
| 4,420,447 | 12/1983 | Nakashima | 264/46.4 |
| 4,477,504 | 10/1984 | Bailey et al. | 428/138 |
| 4,529,639 | 7/1985 | Peoples, Jr. et al. | 264/257 X |

*Primary Examiner*—Philip Anderson
*Attorney, Agent, or Firm*—John C. Evans

[57] ABSTRACT

A composite plastic product is formed by a process which includes formation of a preform of high strength plastic having openings formed therethrough which are covered by a film barrier that is formed during molding of the preform; and wherein the preform is configured to be placed as a unit in a foam station at which material is foamed onto the insert without escape to its backside.

2 Claims, 6 Drawing Figures

METHOD AND APPARTUS FOR FORMING COMPOSITE PRODUCTS

BACKGROUND OF THE INVENTION

This invention relates to molded plastic products and more particularly to a method for manufacturing such products that include a structural load support insert member with functional openings therein which are covered by a film layer and wherein the film layer serves to prevent the escape of material during formation of a layer of polyurethane foam on the insert.

In the past it has been recognized that it is desirable to cover a load support or insert member in a composite plastic product with a film to prevent the escape of material through the insert during a foaming process in which polyurethane material is foamed with respect to the insert.

One such method is set forth in U.S. Pat. No. 4,228,115 issued Oct. 14, 1980 to Gardner for Method of Making a Horn Pad. In this method a horn switch assembly is covered by a plastic film and then the assembly is foamed to form a plastic product with a load support insert, a covering film and a layer of urethane foam. While suitable for its intended purpose, the method of the '115 patent requires that the inserts be fabricated as separate components used in a second manufacturing step which covers the insert with the film and ten moves the "covered insert" to the mold to carry out a foam operation.

U.S. Pat. Nos. 4,420,447 and 4,477,504 both disclose instrument panel constructions and methods for foaming material with respect to a load support insert which is covered by a film to prevent the escape of foam through operative openings in the insert member. In both cases, however, the insert is formed in a first manufacturing step and then the part is covered by film in a second manufacturing step to produce the subassembly used in a subsequent foaming step.

SUMMARY OF THE INVENTION

An object of the present invention is to provide an improved method for manufacturing plastic products having a structural load supporting insert in which openings are formed for association with operative components used in association with a final assembly which includes a composite plastic product formed by use of the present invention. In particular, the method includes the step of combining an insert of the aforesaid type with a film covering to block the holes through the insert and to do so in a single manufacturing step and the step of taking the combined insert and film as a unit to a foam mold station at which the unit is covered with a layer of foam in a manner which will prevent foam leakage to the backside of the insert and which will produce a desirable uniform density, free of excessive voids or other imperfections.

Another object of the present invention is to provide an improved method for manufacturing interior trim parts for automobiles in which a load support member or insert is formed of injection molded plastic with a film layer on one of the mold halves such that the load support member or insert is by a single step formed with a covering of film material to cover any openings therein. The film can be on either side of the insert depending upon whether the plastic is injected through the cover or through the cavity. The next step of the process includes the steps of placing the concurrently formed insert and film cover in a foam mold and supporting it between mold halves such that the film covering of the insert is disposed in facing relationship to the mold cavity. A foamable material is then directed into the mold cavity and allowed to foam therein. The film covering of the unitary insert preform prevents the escape of foam to the backside of the insert thereby to improve product appearance, reduce trim and waste of foam material and to prevent formation of voids or other defects in the foam layer. The improved results are obtained without requiring costly equipment to shrink the film against the insert as in the case of prior processes. Furthermore the method assures that the film will be positively adhered to the insert to prevent delamination of the foam layer from the load support insert. The method also contemplates injection molding thin membranes ("flash") over these same openings to accomplish the same result.

These and other objects of the invention will be more apparent when taken in conjunction with the following detailed description of the invention along with reference to the accompanying drawings.

The objects are achieved in one process which includes the steps of (a) forming a preform of structural plastic including a film cover which covers functional openings in the preform and to do so by injection moldig the preform by use of injection molding tooling which includes the layer of film as a cover over a mold cavity of the tooling; (b) locating the preform within the mold halves of a foam station; (c) pouring foam precursors into the foam station mold cavity and allowing the material to foam against the film layer of the preform and configuring the preform such that the foam will be prevented by the film from escaping to the backside of the preform so as to produce a product with good exterior appearance and one which does not require stripping or trim of foam material with consequent waste.

DETAILED DESCRIPTION OF THE PREFERRED EMBODIMENTS

Figure 1:
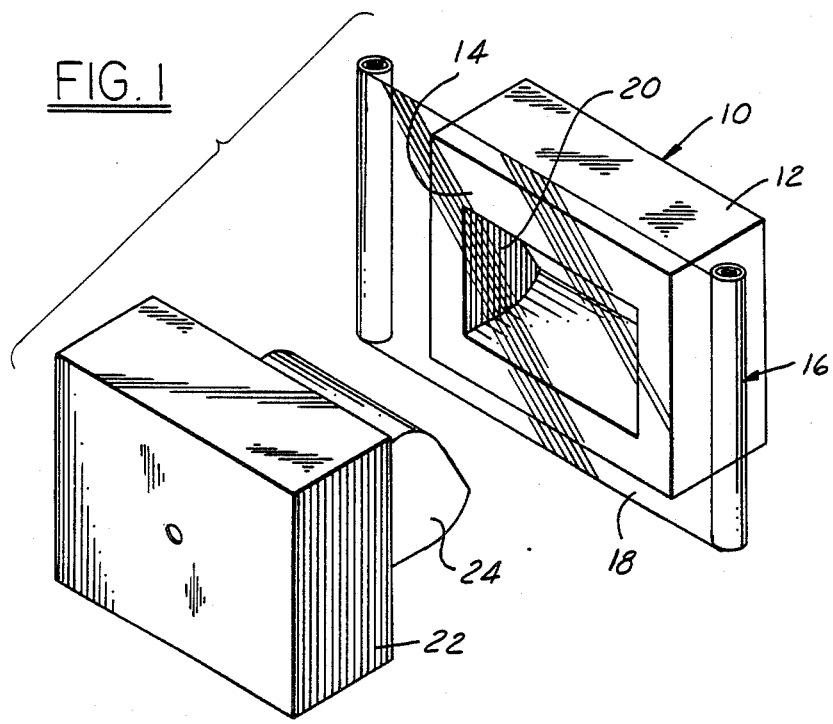
FIG. 1 is a perspective view of apparatus showing one step in the method of the present invention.

Referring now to FIG. 1, an injection molding apparatus 10 is illustrated which includes a split die of the type mounted in known injection mold presses. A mold cavity platen member 12 has a face 14 on which is located a roll 16 of film material. A reach 18 of the material extends over and overlaps the perimeter of a cavity 20 in the member 12.

A mold cover 22 has a die head 24 which will draw the film from roll 16 by pushing against the reach 18.

Figure 2:
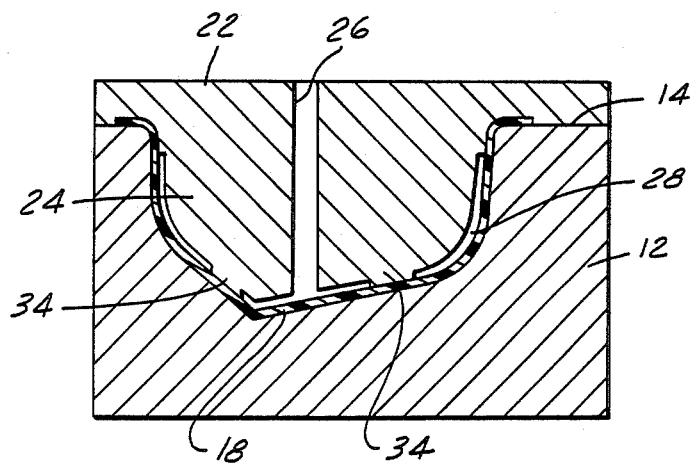
FIG. 2 is a cross-sectional view of the apparatus used in FIG. 1 shown in a closed, injection molding position.

When the mold is closed and the film is positioned as shown in FIG. 2 a suitable blend of injection molding material is directed through a sprue 26 to fill a mold cavity 28. Injection molding pressure during flow of the melt forces film 18 into the mold cavity 20 until it covers the cavity surface as shown in FIG. 2. The material can be ABS, Cycolac L ABS or any other known high strength injectable plastic material such as ABS/PC blend or Dylark.

The film can be a surlyn/EVA coextrusion such as Dupont 1601-2/3190 Surlyn/EVA or straight surlyn or Dow ionomer/EVA coextrusion.

In one embodiment the reach 18 of film is taped to the face of the cavity member 12 and Cycolac, trademark of Borg-Warner Corporation, ABS (acrylonitrile, butadiene and styrene) is injected to fill out the mold cavity 28. The melt temperature is 400° F., the injection pressure is 1400 psi with a 400 psi hold pressure and the mold cycle is 27 seconds. In such case the film remains on the cavity side of the mold part 12. Only very fine air traps exist between the film and the ABS insert 30 formed in the cavity 28. Adhesion of the film to the ABS insert 30 is superior when the EVA (ethylene vinyl acetate) side of the coextrusion is placed against the ABS material. Surlyn alone, however, forms even better if a coextrusion material is not desired. The film is able to withstand the operating temperatures of the injection molding process and consequently defines an impenetrable barrier on the preform 32 as formed by the first step of the inventive process to include a load support member or insert 30 and an integral film cover represented by the reach 18.

The die head 24 includes outboard extensions 34 defining mold inserts that will produce openings 36 in the insert 30 which serve various functional purposes in a finished composite structure. For example, the openings 36 can accommodate duct systems for air outlets in the case of instrument panel applications, or can accommodate switch assemblies or fastener assemblies in the case of armrests, both for interior automotive application.

As is recognized, such openings must be blocked to prevent leakage of material as a foam layer is joined to the insert 30 by known foaming methods.

By virtue of the present invention, the preform 32 has a built in barrier over insert holes without requiring a secondary application of film layers or other barriers with respect to holes in a preformed insert member.

Figure 3:
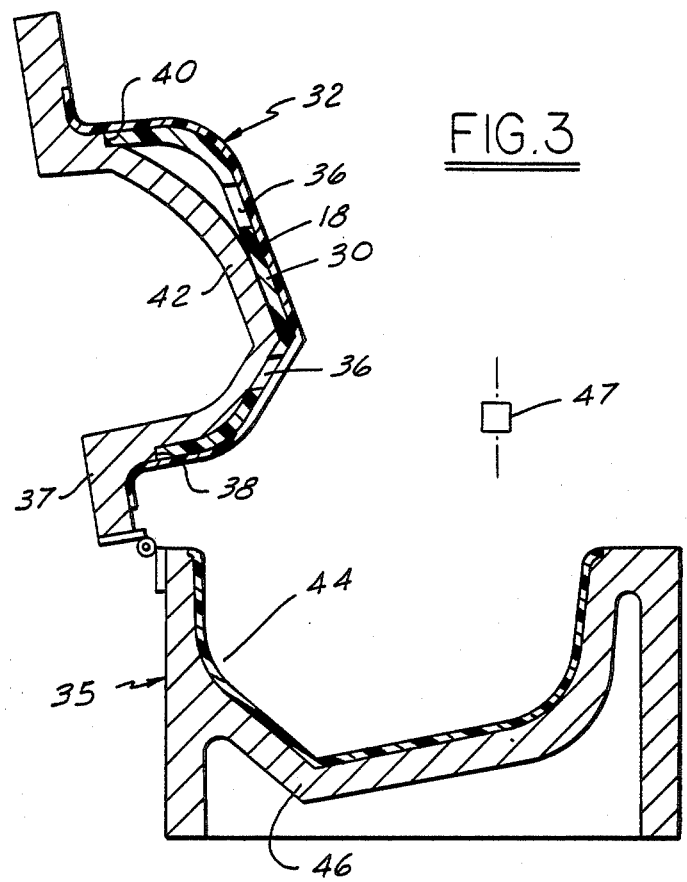
FIG. 3 is a cross-sectional view of a preform of the present invention located with respect to the mold halves of a foam molding station.
Figure 4:
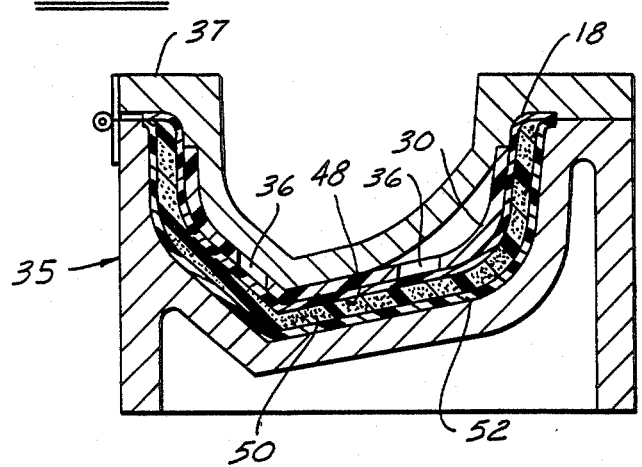
FIG. 4 is cross-sectional view of the apparatus of FIG. 3 shown in a foam molding position.

Thus, the second step of the present method is to place the plastic load bearing preform 32 in a foam mold assembly 35 of the type shown in FIG. 3. The mold assembly includes a cover 37 with guide or reference surfaces 38,40 and a backing plate 42 for the insert 30. The cover 37 will locate the preform 32 within a mold cavity 44 of a lower mold part 46. When the mold is open and the preform 32 is in place on the cover 37, precursors for a foam material are poured through a mixhead 47 into the cavity 44. The cover 36 is then closed to form a space 48 into which the foam precursors are allowed to expand in a known manner to fill the space with a suitable layer 50 of foam material such as foamed urethane. The advantage of the use of a preform 32 is that the mold lid stays clean, and a polyethylene film does not have to be applied to the lid each cycle.

Figure 5:
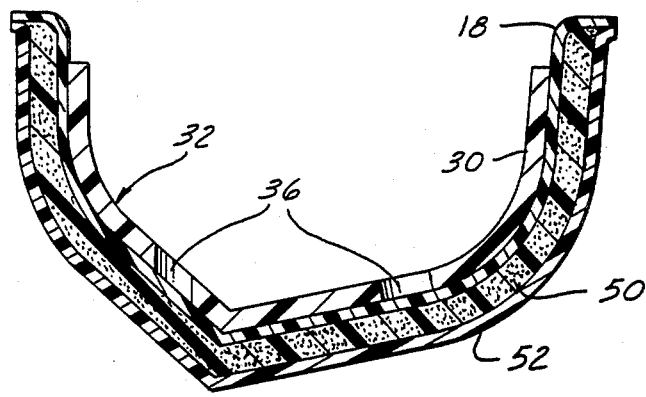
FIG. 5 is an enlarged cross-sectional view of a composite plastic product produced by use of the method and apparatus of the present invention.
Figure 6:
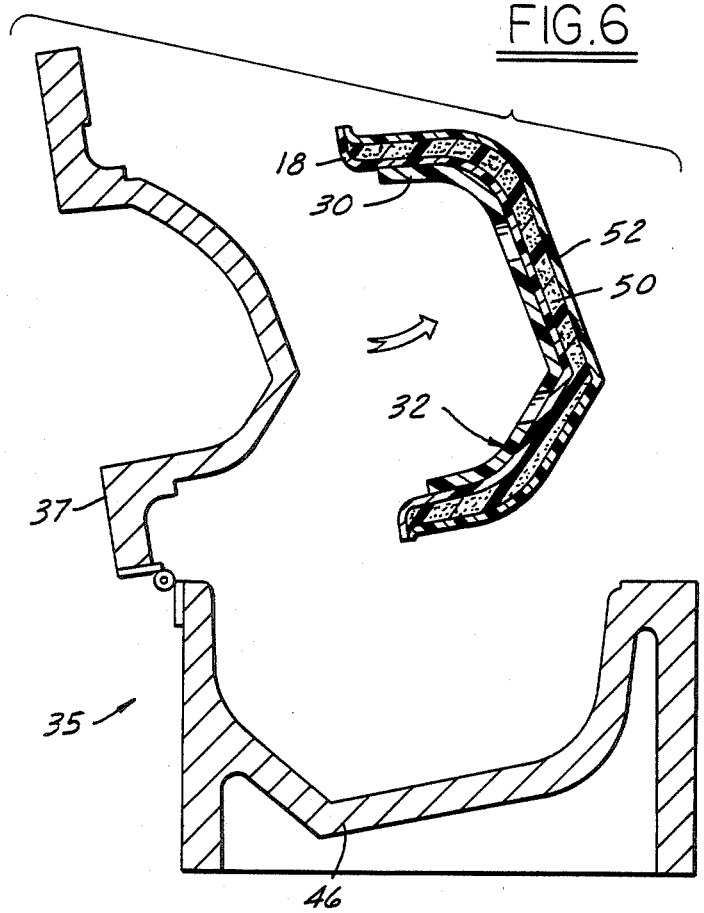
FIG. 6 is a cross-sectional view of the apparatus of FIG. 3 with the finished product shown in its product release position.

In an illustrated arrangement, the cavity 44 is covered by a layer 52 of vinyl which defines the outer cover of a finished composite as shown in FIG. 5.

Even with complex shapes, the film reach 18 stretches and bridges all openings in the insert 30. Consequently, there are no paths for the escape of foam material to the backside of the insert 30. The finished product thus has a good exterior appearance and there is no waste of foam material or need to trim excess foam material from the product all due to the ability to suitably gasket the periphery and seal off the mold using a film/vinyl insert interface 54.

Suitable known urethane processes can be used in practicing the invention.

The foam molding process results in good adhesion of the foam layer 50 to the preform 32 and does cause separating of the film cover defined by the reach 18 from the underlying load supporting plastic insert 30. The product thereby retains or improves upon the desired physical properties for such composite structures while eliminating the need for separate processing steps to place a foam barrier with respect to a separately formed insert member or separate steps and elements to locate individual plugs in the mold assembly to close insert holes of the type discussed.

What is claimed is:

1. In a method for blocking holes for the escape of foam material through a load supporting insert of a composite plastic part including the insert and a layer of foam bonded to the insert by reaction injecting foam precursors in a mold cavity in part bounded by the insert the improvement comprising:

providing a plastic injection molding press including a cavity platen with a mold surface and marginal edges defining an open-ended cavity;

covering the cavity platen with a deformable sheet of polymeric material extending across the marginal edges to cover the open end of the cavity;

providing a die cover having outboard extensions defining insert openings through a load supporting insert to be formed with respect to the die cover during an injection molding process;

aligning the die cover with the deformable sheet of polymeric material and advancing the die cover against the sheet to force it against the mold surface of said cavity platen to conform the sheet to the insert means while defining a closed injection mold space;

injecting plastic into the mold space to further conform the deformable sheet to the mold surface and to bond the deformable sheet to an insert shaped around the insert means to form openings therethrough with a covering segment of the deformable sheet for preventing flow of foam material through the openings in a subsequent foam molding operation.

2. In the combination of claim 1, removing the die cover having the outboard extensions from the cavity platen and extracting the load supporting insert having the openings therein and the film joined thereto from the cavity platen;

transporting the joined load supporting insert and the film sheet thereon to a foam molding station and supporting the joined load supporting insert and the film sheet with respect to foam mold tooling to form a foam cavity with respect to one face of the joined load supporting insert and the film sheet;

and thereafter directing foam precursors into the foam cavity and reacting the foam material in the cavity;

sealing the escape of foam material from the cavity by retaining the film sheet on the load supporting insert during the foaming process.

* * * * *